UNITED STATES PATENT OFFICE.

HANS MANSFELD, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

GALLOCYANIN COMPOUNDS AND PROCESS OF MAKING THEM.

1,028,045. Specification of Letters Patent. Patented May 28, 1912.

No Drawing. Application filed May 20, 1911. Serial No. 628,510.

*To all whom it may concern:*

Be it known that I, HANS MANSFELD, Ph. D., chemist, subject of the King of Prussia, residing at Ludwigshafen-on-the-Rhine, Germany, have invented new and useful Improvements in Gallocyanin Compounds and Processes of Making Them, of which the following is a specification.

I have found that gallocyanins and derivatives thereof can be converted into condensation products thereof by heating the said gallocyanins or derivatives thereof with dihydroxy tartaric acid, or with tartronic acid. The acids can be employed either as such or in the form of their salts, if an acid be present during the reaction, and the acid may be added in the form of the gallocyanin salt of such acid.

In carrying out this invention, the gallocyanin coloring matters or substitution products or derivatives or leuco compounds thereof may be employed, and the reaction may be carried out either with or without the addition of acid other than that required to set free the dihydroxy tartaric acid, or the tartronic acid. The condensation products are first produced in the condition of their leuco compounds, which have the advantage over the ordinary leuco compounds, obtained by the action of reducing agents on gallocyanins, that they are more easily soluble and are, consequently, more suitable for printing purposes. The coloring matters which are obtainable from the leuco compounds by oxidizing them by air or other oxidizing agent dye mordanted wool shades which are bluer than those obtained from the corresponding initial coloring matters.

My new compounds are characterized by being easily soluble in water and in sulfuric acid; they yield dull greenish brown solutions in glacial acetic acid and in amyl alcohol, and they yield on mordanted wool shades which are bluer and considerably stronger than the shades produced by the initial gallocyanins.

Since the products obtained by employing tartronic acid are identical with or very similar to the products obtained when employing dihydroxy-tartaric acid, tartronic acid may be considered as equivalent to dihydroxy-tartaric acid for the purposes of this invention.

The following examples will serve to illustrate how my invention can be carried into practical effect, but the invention is not confined to these examples. The parts are by weight.

Example 1: Heat together slowly, while stirring, thirty-five parts of prune (obtainable from nitroso-dimethyl-anilin and the methyl ester of gallic acid), twenty-six parts of eighty-six per cent. sodium dihydroxy tartrate, from fifty to one hundred parts of water, and thirty-four parts of twenty-eight per cent. sulfuric acid. As soon as the boiling point is reached, the gallocyanin dissolves and, in from ten to twenty minutes, the original violet-blue solution turns dull brown. The reaction mixture can then be directly employed for dyeing purposes, or the leuco compound can be salted out, filtered off, and dried at a low temperature.

Example 2: Stir together, for three hours, at ordinary temperature, thirty-five parts of gallocyanin hydrochlorid (obtainable from gallic acid and nitroso-dimethyl-anilin), twenty-six parts of eighty-six per cent. sodium dihydroxy tartrate, twenty-five parts of thirty-two per cent. hydrochloric acid, and one hundred parts of water. Then place the vessel under reduced pressure and dry the contents while the said vessel is subjected to an external temperature not exceeding one hundred degrees centigrade.

In a similar manner, other gallocyanins, or substituted gallocyanins, for instance anilido gallocyanin, can be converted into the leuco condensation products. Instead of water, other solvent, or suspension agent, for instance alcohol and glacial acetic acid, may be employed.

Now what I claim is:—

1. The process of producing compounds of the gallocyanin series by reacting on a gallocyanin compound with dihydroxy-tartaric acid.

2. The process of producing a compound of the gallocyanin series by reacting on gallocyanin hydrochlorid with dihydroxy-tartaric acid.

3. As new articles of manufacture the compounds of the gallocyanin series which are obtainable by reacting on a gallocyanin compound with dihydroxy-tartaric acid which compounds are soluble in water and in sulfuric acid, yield dull greenish brown solutions in glacial acetic acid and in amyl alcohol and which yield on mordanted wool shades which are bluer and considerably stronger than the shades produced by the initial gallocyanins.

4. As an article of manufacture the compound which can be obtained by reacting on gallocyanin hydrochlorid with dihydroxy-tartaric acid which new compound is soluble in water and is also soluble in sulfuric acid yielding a solution which possesses little color, but which on the addition of an oxidizing agent turns deep blue, which new compound is also soluble in glacial acetic acid and in amyl alcohol yielding dull greenish brown solutions, and which yields on mordanted wool shades which are bluer and considerably stronger than those obtainable from gallocyanin hydrochlorid.

In testimony whereof I have hereunto set my hand in the presence of two subscribing witnesses.

HANS MANSFELD.

Witnesses:
   J. ALEC. LLOYD,
   A. O. TITTMAN.